United States Patent [19]

Panaro

[11] Patent Number: 5,731,839
[45] Date of Patent: Mar. 24, 1998

[54] BITSTREAM FOR EVALUATING PREDICTIVE VIDEO DECODERS AND A METHOD OF GENERATING SAME

[75] Inventor: Paul Joseph Panaro, Helmetta, N.J.

[73] Assignee: David Sarnoff Research Center, Inc., Princeton, N.J.

[21] Appl. No.: 597,302

[22] Filed: Feb. 6, 1996

[51] Int. Cl.⁶ .............................. H04N 7/12; H04N 11/02; H04N 11/04
[52] U.S. Cl. .................. 348/416; 348/181; 348/180; 386/109; 375/224
[58] Field of Search ...................... 348/181, 390, 348/405, 407, 415, 416, 180; 375/224, 225, 226, 227, 228; 386/33, 109, 111, 112

[56] References Cited

U.S. PATENT DOCUMENTS

| | | | |
|---|---|---|---|
| 4,724,484 | 2/1988 | Ward | 386/67 |
| 5,231,484 | 7/1993 | Gonzales et al. | 348/405 |
| 5,245,413 | 9/1993 | Teichner et al. | 348/181 |
| 5,274,445 | 12/1993 | Overton et al. | 348/181 |
| 5,313,280 | 5/1994 | Straus | 348/181 |
| 5,452,006 | 9/1995 | Auld | 348/390 |
| 5,537,145 | 7/1996 | Miseli | 348/181 |

OTHER PUBLICATIONS

Huang, S.J., MPEG-2 Video DecoderCompliance Test Methodology, 1995 Canadian Conference on Electrical and Computer Engineering (Cat. No. 95TH8103), pp. 559-562, Sep. 8, 1995.

*Primary Examiner*—Tommy P. Chin
*Assistant Examiner*—Frank Snow
*Attorney, Agent, or Firm*—William J. Burke

[57] ABSTRACT

A bitstream for testing a video decoder that produces visual distortions in the output video images from the decoder whenever the decoder produces an error in decoding the bitstream. Specifically, the bitstream tests a predictive-type video decoder's capability to decode predicted images that do not propagate errors to other images or frames. For example, the bitstream is capable of demonstrating errant decoding of B-frames by an Moving Pictures Experts Group (MPEG) video encoder. A method and apparatus for generating and using the test bitstream is also disclosed.

23 Claims, 6 Drawing Sheets

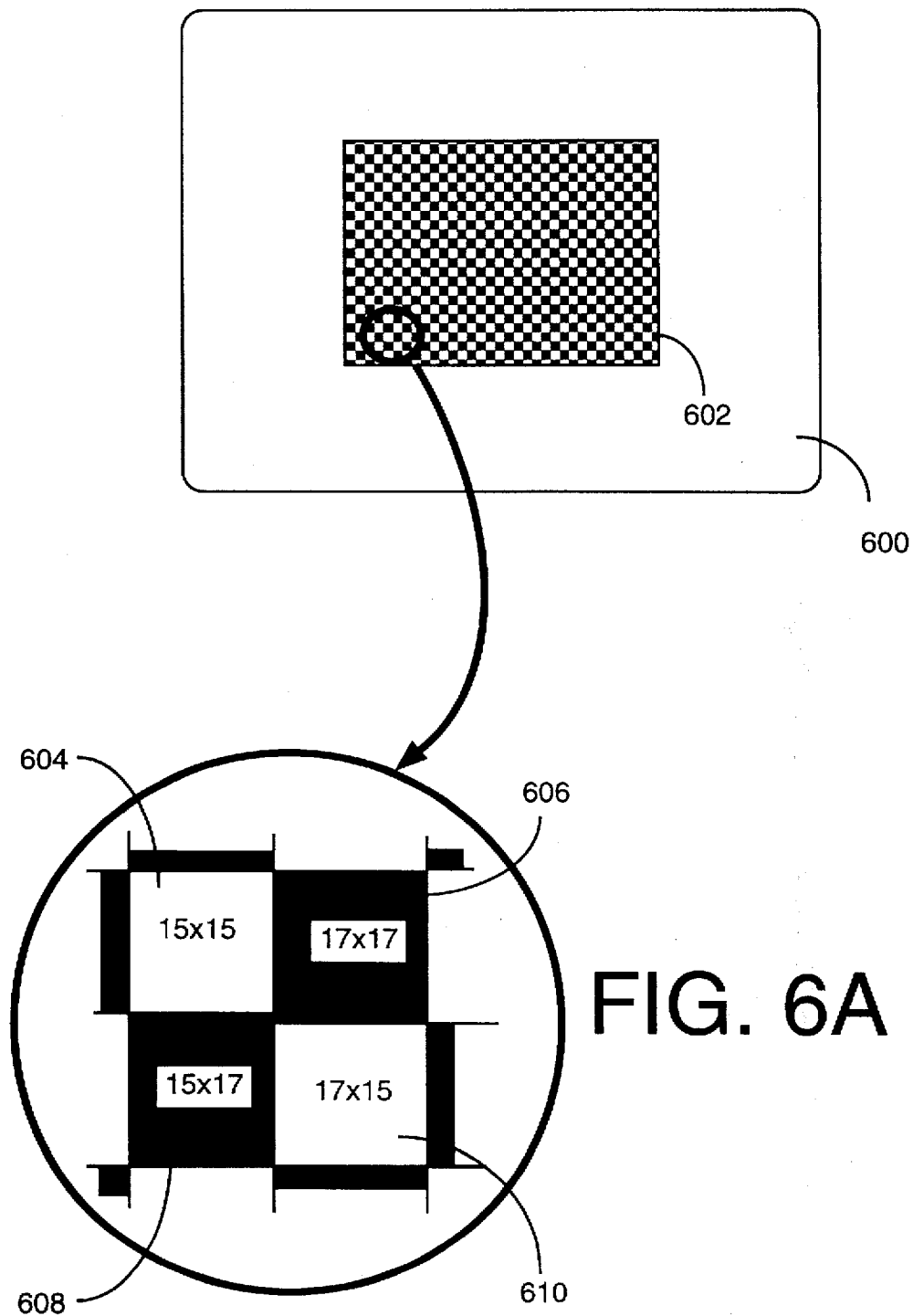

BITSTREAM FOR EVALUATING PREDICTIVE VIDEO DECODERS AND A METHOD OF GENERATING SAME

The present invention relates to a method and apparatus for evaluating the decoding of video signals. More particularly, this invention relates to a "non-invasive" method and apparatus that evaluates the performance of a "black box" video decoder by observing the response of the decoder to a predefined sequence of input signals.

BACKGROUND OF THE INVENTION

The increasing development of digital video/audio technology presents an ever increasing problem of reducing the high cost of compression codecs and resolving the interoperability of equipment of different manufacturers. To achieve these goals, the Moving Picture Experts Group (MPEG) created the ISO/IEC International Standards 11172-2 (1993) (generally referred to as MPEG-1 video) and 13818-2 (Jan. 20, 1995 draft) (generally referred to as MPEG-2 video), which are incorporated herein in their entirety by reference. One goal of these standards is to establish a standard coding/decoding strategy with sufficient flexibility to accommodate a plurality of different applications and services such as desktop video publishing, video conferencing, digital storage media and television broadcast.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. Furthermore, MPEG encoder designers are accorded great flexibility in developing and implementing their own MPEG-specific algorithms. This flexibility fosters development and implementation of different MPEG-specific algorithms, thereby resulting in product differentiation in the marketplace.

Digital decoders (such as MPEG video decoders) present a difficult testing problem when compared to analog systems. An analog system has minimal or no memory and is generally linear, such that the system's behavior is instantaneous. Thus, the behavior of an analog system can be extrapolated from one signal range to another.

In contrast, digital decoders are highly non-linear and often contain memory. A digital decoder may operate normally over a certain range of a certain parameter, but may fail dramatically for certain other values. In essence, the behavior of a digital decoder cannot be extrapolated from one signal range to another.

Generally, the testing of complex digital systems such as decoders is performed by stimulating the decoder under test with a known sequence of data, and then analyzing the output data sequences or the intermediate data sequences using, e.g., a logic analyzer, to determine if the results conform to expectations. Although this is an effective testing technique, it requires extensive knowledge of the circuit implementation or observation of internal nodes of the particular decoder.

However, in many instances the decoder is a "black-box" that accepts a bitstream (encoded video signal) as input and provides a digital or analog representation of the decoded signal as an output. Due to product differentiation in the marketplace, it may not be possible to acquire such technical information for all decoders. In fact, even if such technical information is available, it may not be cost effective to construct a different test sequence for every decoder.

Therefore, a need exists in the art for a bitstream for testing MPEG-like video decoders without prior knowledge of the particular circuit implementation of any particular decoder. Additionally, a need exists for a method for creating a test sequence or bitstream that will produce visually detectable errors in the image produced by a video decoder if the decoder does not properly decode the bitstream.

SUMMARY OF THE INVENTION

The present invention overcomes the disadvantages heretofore associated with the prior art. The present invention is a bitstream for testing a video decoder that produces visual distortions in the output video images from the decoder whenever the decoder produces an error in decoding the bitstream. Specifically, the bitstream tests a predictive-type video decoder's ability to decode predicted images that do not propagate errors to other images or frames. For example, the bitstream is capable of demonstrating errant decoding of B-frames by a Moving Pictures Experts Group (MPEG) video encoder.

The invention further includes a method of fabricating the test bitstream. The method generates two anchor images having a uniformly gray region located centrally within each image. The region in the first anchor image is assigned a set of motion vectors having a predefined characteristic, e.g., direction and magnitude. The region in the second anchor image is assigned a set of motion vectors having a predefined characteristic (e.g., magnitude and/or direction) that differs from the predefined characteristic of the motion vectors associated with the first anchor image. The motion vectors of the two anchor images, when used by a predictive decoder to predict a predicted frame, should generate the uniform gray region. Lastly, the method forms a predicted image having a uniform gray region located at the location of the predicted location of the region using the anchor images. The method codes the sequence of images (e.g., the two anchor images and the predicted image) using a predictive coder such as an MPEG coding algorithm. This coded sequence of images forms the test bitstream.

When this test bitstream is decoded by a predictive decoder, a sequence of images is produced upon a video monitor. When decoded properly, the images will have a uniformly gray region located within the decoded sequence of images. However, if the decoder improperly decodes the bitstream, a noticeable distortion will appear in the decoded images. The nature of the distortion indicates the type of decoder error.

Furthermore, the bitstream may contain a coded title image as well as a coded termination image (known as a "VERIFY" screen). Upon decoding the bitstream, the decoder produces the title image, then the test images and, lastly, the termination image. To ensure that a substantial number of bits are reserved for coding the test images (e.g., the P- and B-frames described above), the title and termination images are designed to be coded efficiently. For example, the title image contains only smooth fonts, i.e., no sharp corners or edges, and a white border. Also, the termination page contains a blocky font having the pixel blocks that define the font aligned with the pixel blocks used by the coder that produces the bitstream. In this manner, the title and termination images are coded efficiently resulting in additional coding bits being available for coding the test images.

BRIEF DESCRIPTION OF THE DRAWINGS

The teachings of the present invention can be readily understood by considering the following detailed description in conjunction with the accompanying drawings, in which:

FIG. 6 depicts a test frame 600 containing an offset checkerboard pattern 600.

To facilitate understanding, identical reference numerals have been used, where possible, to designate identical elements that are common to the figures.

DETAILED DESCRIPTION

Figure 1:
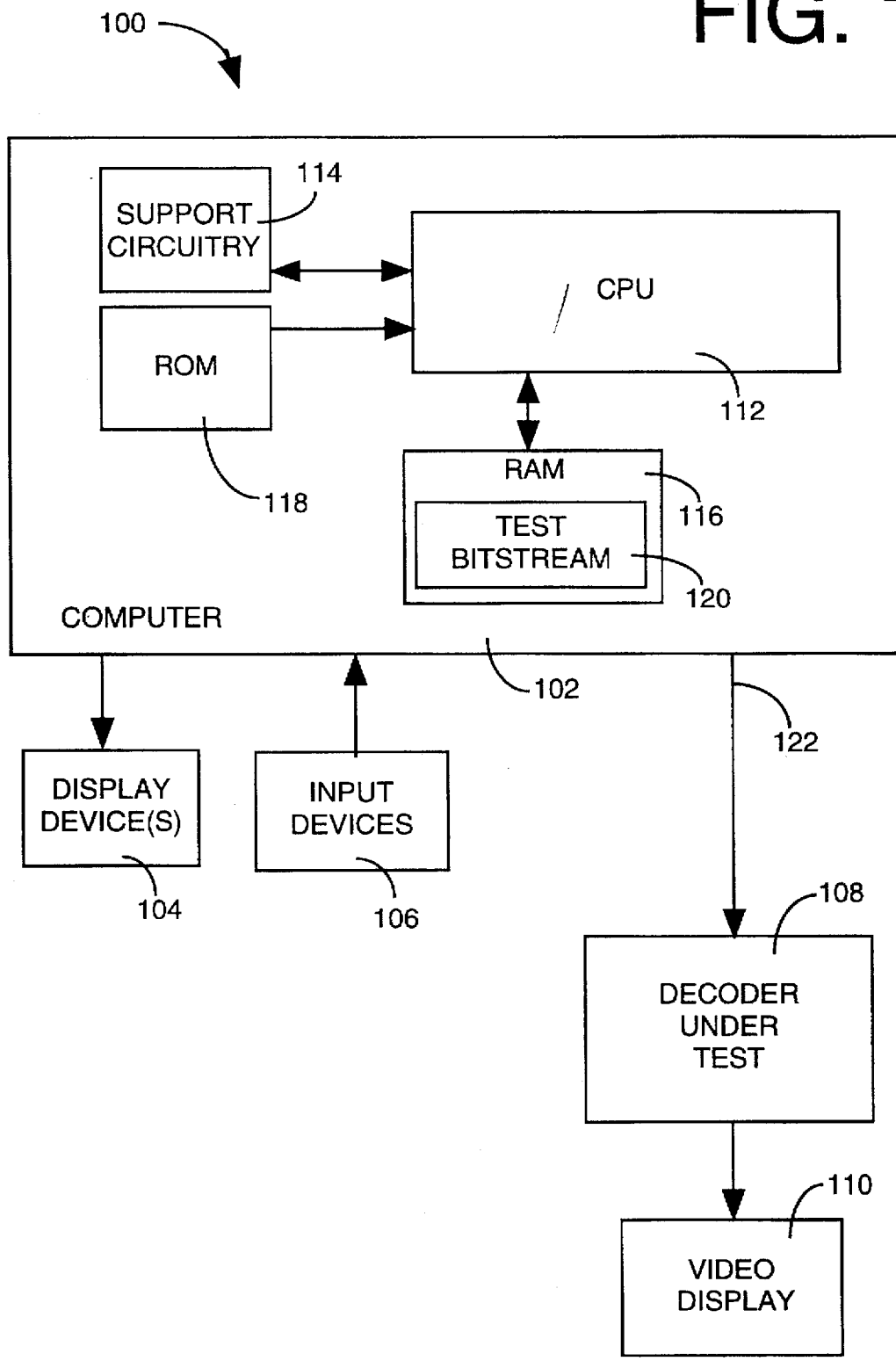
FIG. 1 depicts a experimental test set up used to test video decoders using the bitstream of the present invention.

FIG. 1 depicts an experimental test set-up 100 that produces a particular bitstream, applies the bit stream to the input of a decoder under test (DUT) 108 and permits user observation of the image(s) produced by the decoder on a video display 110. More specifically, the test system produces a test bitstream using a general purpose computer system 102. The computer system contains a central processing unit (CPU) 112, support circuits 114, read only memory (ROM) 118, random access memory 116, display device(s) 104 and input device(s) 106. The CPU 112 is a conventional microprocessor supported by standard hardware such as RAM 116, ROM 118, and general support circuitry 114, e.g., a power supply, a clock, mass memory and other such circuitry all of which is not specifically shown. The CPU 112 recalls a predefined test bitstream 120 from memory and sends, through a serial port 122, the selected bitstream to the decoder under test 108. A user merely observes the video display 110 to view errors that arise during the decoding process. Typically, each bitstream is designed to test one or more specific features of a decoder 108. As such, upon failure of the decoding feature being tested, a distinct pattern of errors will appear in the decoded image(s) appearing on the video display 110.

It should be noted that the DUT may not be a hardware device, but could be a software implementation of a video decoder. As such, the decoder would also reside in RAM and be executed by the CPU. Once executed, the CPU recalls the test bitstream from memory and applies it to the software implementation of the decoder. The decoded output image (s) is displayed upon the display device 104 for the computer system.

When testing a predictive decoder, e.g., MPEG-type decoder, the bitstreams typically are designed to propagate errors from one decoded image to the next such that the errors accumulate and are easily seen in the decoded image. However, some types of images in an MPEG coding scheme are decoded without propagating the errors to other frames (images). These images or flames are known as "bi-directional motion prediction frames" (or so-called B-frames). The B-frames are predicted from one or more other "anchor" image frames (e.g., P-frames and I-flames). Under the MPEG standard, the anchor frames from which a B-frame is predicted straddle the B-frame. That is, one anchor frame occurs prior to the B-flame and one occurs after the B-flame. As such, the motion vectors accessing data from the anchor frame occurring before the B-frame are known as forward vectors and the motion vectors accessing data from the anchor flame occurring after the B-flame are known as backward vectors.

To test the decoding of a B-frame and produce repeatable B-flame image that can be observed, the test bitstream must contain specific information representing two anchor frames and a predicted frame. As the decoder decodes this sequence of images, the decoded images will be distorted if the decoder is not operating properly. One way of testing the B-frame decoding process is to code identical forward and backward motion vectors for the anchor flames that when decoded produce a uniform gray region within the predicted image. However, using identical motion vectors does not result in effective error detection because an identical error in decoding each direction of motion vector may cancel each other such that a uniform gray region is produced in the decoded image sequence even though the decoder is not operating properly.

The invention uses a bitstream containing two coded anchor flames and a coded bi-directional predicted frame. This frame sequence, when properly decoded, produces a sequence of images having a predefined pattern or object in the images. When the decoder improperly decodes the bitstream, the predefined object appears distorted. The nature of the distortion is indicative of the decoding error.

Specifically, the bitstream is a coded bi-directional predicted flame (B-flame) and two coded anchor images (predicted images or P-flames) that contain forward motion vectors that differ from the backward motion vectors. However, the B-flame that is ultimately generated from the two anchor images produces, when correctly decoded, a uniform gray region within the decoded image. However, an error in the decoding process for either direction of motion vector will be visible in the B-flame image as a distortion in the uniform gray region. Since the region of interest in the B-frame is uniformly gray, not many bits are used to encode the B-frame, therefore, many bits can be allocated to encoding the anchor flames. Thus, complicated sets of motion vectors can be formulated to fully exercise the decoder's capabilities without risking exceeding the decoder's bit budget.

Figure 2:
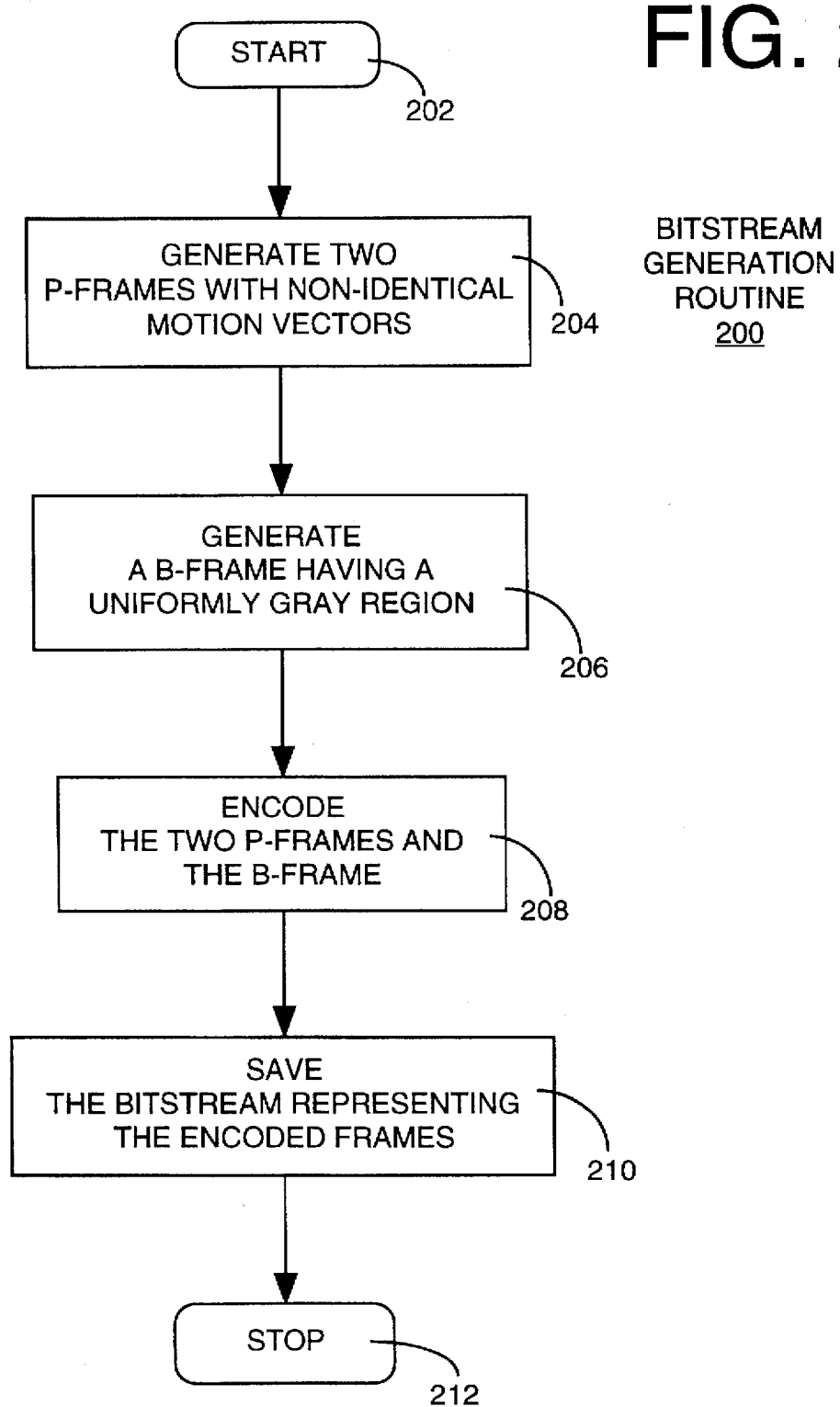
FIG. 2 depicts a flow diagram of a routine for generating the bitstream of the present invention.
Figure 3:
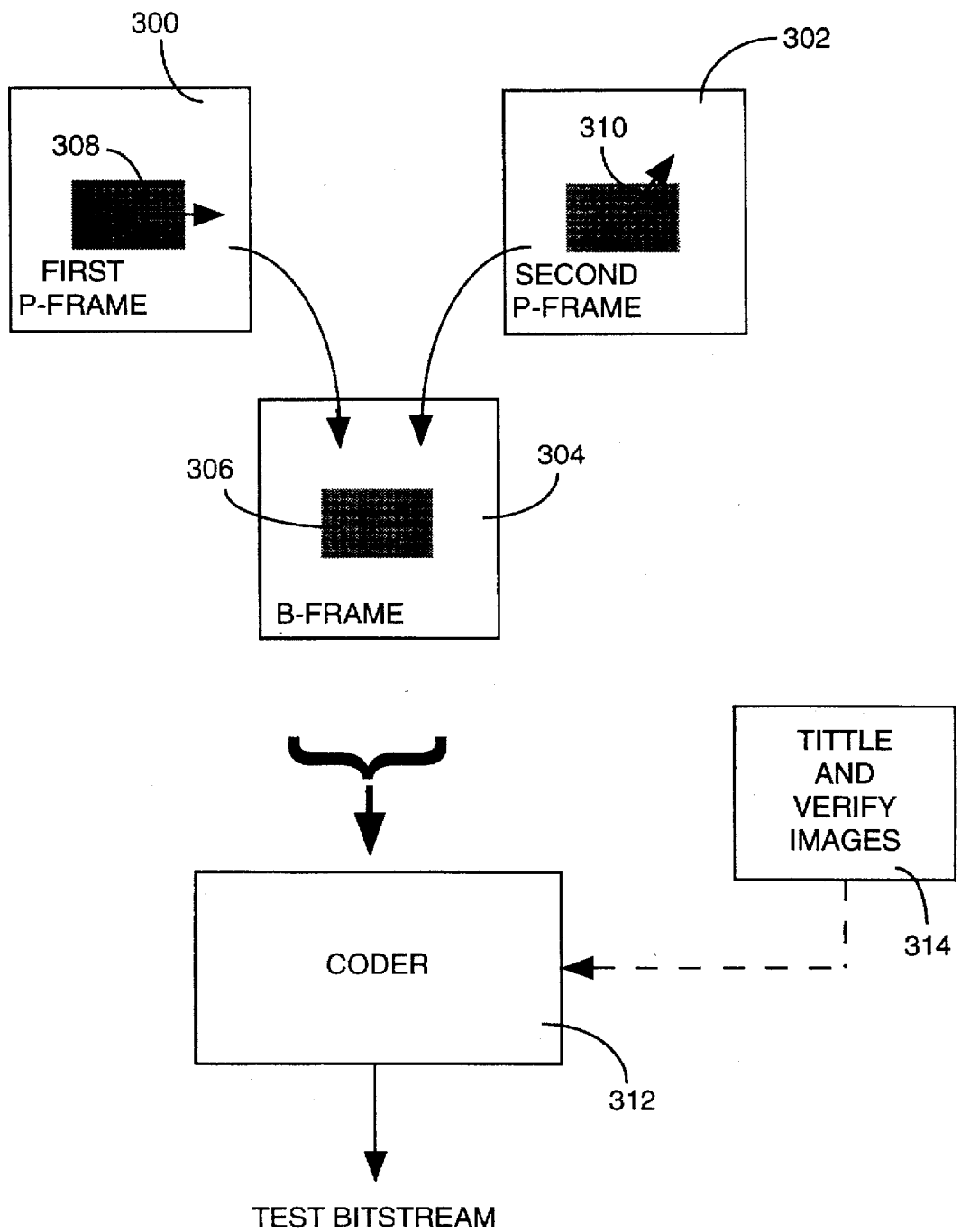
FIG. 3 schematically depicts a frame sequence used to produce the test bitstream.

FIG. 2 depicts a flow diagram of an illustrative method (routine 200) for generating the bitstream for-testing a B-frame decoding process of a predictive video decoder. FIG. 3 schematically depicts the frames and their motion vectors as used to produce the bitstream. The reader will best understand the invention by simultaneously consulting both FIGS. 1 and 2.

The bit stream generation routine 200 is typically executed on a general purpose computer such as that depicted in FIG. 1. The routine 200 begins at step 202 and proceeds to step 204. At step 204, the routine forms a sequence of the two P-flames 300 and 302 that have non-identical motion vectors 308 and 310, i.e., the horizontal and vertical offsets that define the vectors differ. However, these P-flames are designed to substantially predict a uniformly gray region 306 within a B-flame 304, i.e., when combined by the decoder, the two image substantially produce an image with a uniform gray region. Typically, the two frames are created by hand, i.e., a user selects appropriate motion vector magnitudes and directions (offsets) that substantially generate the uniformly gray region in an image predicted from the anchor images. The motion vectors are selected such that the coverage of the two anchor images, i.e., the average of the macroblocks related to the motion vectors, produces a uniform gray region. The gray region typically has an area that is equivalent to an integer multiple of the pixel block (macroblock) size that is used by the image coder. This gray region could be as large as the entire image or as small as a single motion compensated unit of pixels, e.g., a 16×16 pixel macroblock.

At step 206, the routine produces a B-frame 304 having a uniform gray region 306 located where the combined anchor images should reproduce the gray region. In essence, knowing that the decoder will process the two anchor images to produce a B-frame, the invention uses two P-flames that, when decoded properly, produce the desired B-flame. Thus, the invention predefines the images that will be coded to form the bitstream and then decoded to form the observable images.

At step 208, the routine codes, using a conventional block-based, predictive video coder 312 such as an MPEG encoder, the two P-flames and the B-frame. Such conventional coding is described in ISO/IEC 13818-2, "MPEG-2 Video Specification", Recommendation ITU-T H.262 (1995 E), Jan. 20, 1995; D. LeGall, "MPEG: A Video Compression Standard for Multimedia Applications:, Communications of the ACM, April 1991, Vol. 34, No. 4; and S. Baron and W. R. Wilson, "MPEG Overview", SMPTE Journal, June 1994.

The result of the encoding process is a bitstream that tests the effectiveness of a decoder's capability in decoding B-frames. This bitstream is saved in memory at step 210. The routine stops at step 210. By repeating this bitstream as a decoder input, any errors in the decoding process will appear in the decoded image as imperfections in the uniformly gray region. Furthermore, by having non-identical forward and backward motion vectors, a decoding error will propagate to the next predicted image (P-frame) and result in a P-flame error that distorts the decoded image. The shape or look of the distortion is indicative of which direction of motion vector is not being decoded properly. Typical errors include bright dots and/or lines within the B-frame decoded image. Thus, a user, by merely observing the video display as the bitstream is decoded, can easily see that an error has occurred and what type of error has occurred.

To ensure that B-flame decoding errors are visible in the decoded image sequence, the B-flames are repeated a plurality of times, e.g., fifteen. Thus, a complete Frame sequence, for example, starts with an I-frame, followed by a P-flame, fifteen B-frames and another P-frame. Symbolically the sequence looks like this in display order:

IPBBBBBBBBBBBBBBBBP

Typically, to ensure that anomalies are visible there are 45 to 60 B-frames between P-frames. The entire sequence of I-,P-, and B-frames is encoded to form the test bitstream.

To ensure that a motion vector does not extend over the edge of a decoded image, the bit stream only contains motion vectors for the center blocks and does not contain vectors for edge blocks, e.g., the gray region is typically centered within the image. This limitation is incorporated into the P-frames as they are formed in step 204. Overhanging motion vectors can cause unpredictable errors in the image produced by the decoder under test. As such, a user will not know if the anomaly in the image is generated by a decoding error or an error due to an overhanging motion vector. As such, the invention eliminates the possibility of such anomalous behavior and, as such, any imperfections in the output image are known to be produced by decoding errors.

To complete the bitstream, a title image 314 is optionally appended to the beginning of the frame sequence used to generate the test bitstream. The title image is coded along with the test images and appears as a decoded image to identify the type of test being conducted. To effectively test a decoder, the title image must be as easy to code as possible such that the "bit budget" for encoding the title image as well as the test images is not exceeded. The bit budget refers to the number of bits allocated to code a given type of image (I-, P-, or B-frame in MPEG terminology) such that the frame buffer within the decoder will not underflow or overflow.

Figure 4:
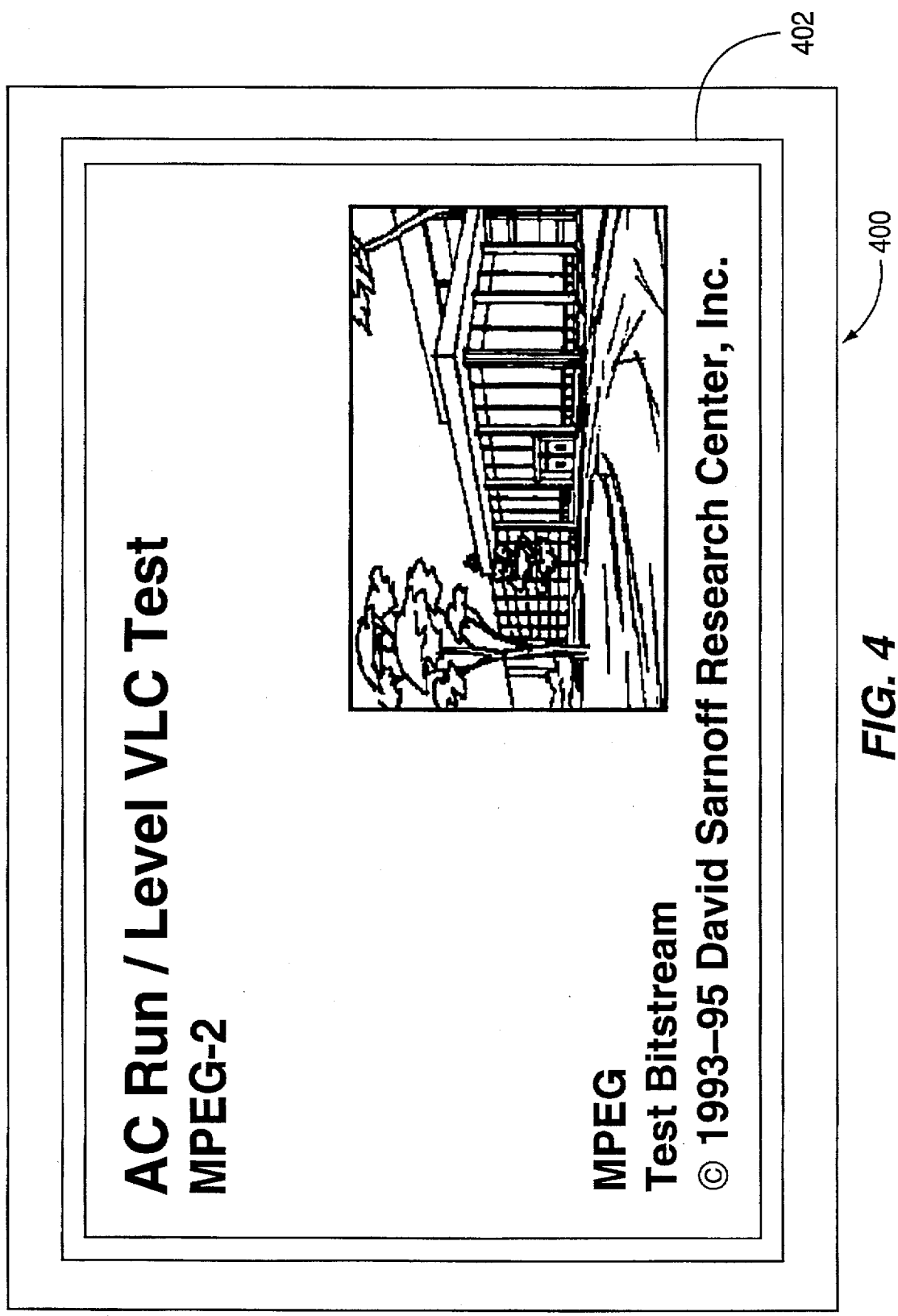
FIG. 4 depicts a title image for a test bitstream.

FIG. 4 depicts an illustrative title image 400. To form an easily codeable title image, the font of any text used should not contain sharp or pointy edges. For example, a non-serif font is preferred. Any sharp edges generate high energy AC terms in the DCT domain. Such terms require additional coding bits and, as such, images containing sharp edges are inefficient to code.

Also a white-filled border 402 that is aligned to the 8×8 block boundaries of the block-based, predictive coder such as an MPEG video coder. Such a boundary alignment produces only DC terms in the DCT domain when the boundary areas are coded. The DC terms are very easy to code using very few bits. Using these constraints in designing a title image allows for many more bits to be allocated to code the test images. As such, more sophisticated tests can be produced. Also, it is important that encoding artifacts be minimized so that any artifacts noticed by a viewer are flaws in the decoding process and not in the encoding process. Thus, the images to be encoded should be as simple as possible to reduce the possibility of encoder error.

Figure 5:
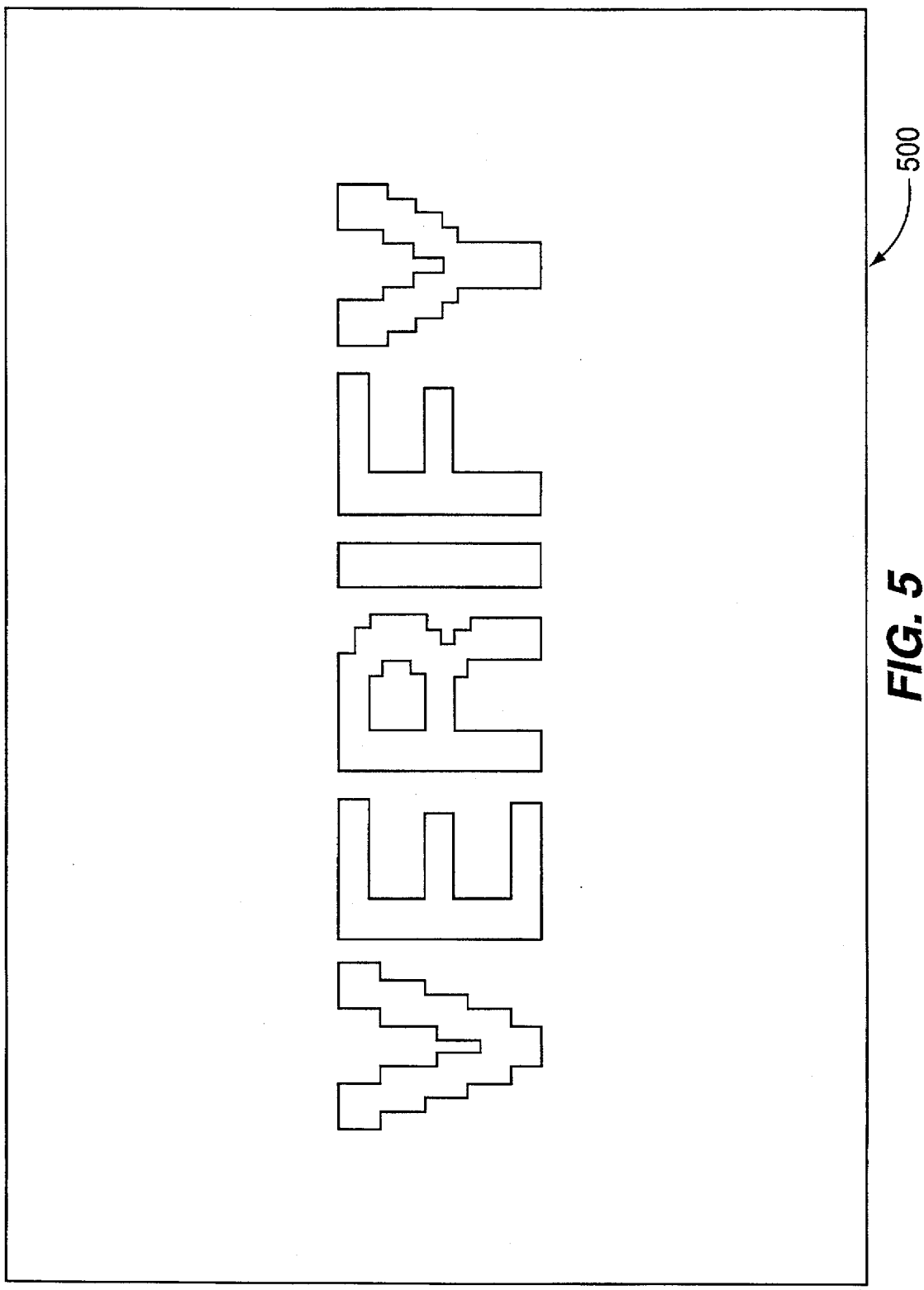
FIG. 5 depicts a "VERIFY" image for a test bitstream.

Each test bitstream typically terminates with an encoded image (generally referred to as a termination image) having a particular pixel pattern that indicates the test is complete. As an illustration, the last image contains the word "VERIFY" and is known as the VERIFY screen or image. This image 500 is depicted in FIG. 5. The VERIFY screen contains the word VERIFY which has a blocky appearance, e.g., uses a blocky font to ease coding of the image. Preferably, the blocks that comprise the text are aligned to the block sized used in the coding process, e.g., 8×8 pixel blocks used in the MPEG coding process. To further improve coding efficiency, the background of the VERIFY screen is typically a uniform gray color. As such, the fewer bits used to code the VERIFY image, the more bits available for coding the test images themselves.

Another feature of the invention ensures that the discrete cosine transform (DCT) coefficients within the bitstreams always contain AC components. Typical test bitstreams are formed by encoding particular test image sequences having predefined pixel patterns. These patterns exercise specific features of a given decoder. Test frames used to test the decoder may use a checkerboard test pattern or other easy to code pattern. The test pattern is coupled with certain other information to test specific aspects of the decoder. However, the smallest pattern features are typically 16×16 pixel blocks within the test frame. To easily code the test frames, the pattern blocks are aligned with the macroblocks and, when coded, only produce DC components as DCT coefficients.

To ensure that AC components are always produced by the encoder, the test frames contain pixel blocks that do not align with the macroblocks used by the encoder. These non-aligned blocks form an offset checkerboard pattern. Such an offset checkerboard pattern is easy to code but ensures that AC components appear in the DCT coefficients. This form of pattern can be substituted for the uniform gray region discussed above.

FIG. 6 depicts a test frame 600 containing the offset checkerboard pattern 600. Within any 2 macroblock by 2 macroblock region, as depicted in FIG. 6A, there is an offset pixel pattern. The pattern contains a first 15×15 pixel block 604, a second 17×17 pixel block 606, a third 15×17 pixel block 608 and a fourth 17×15 pixel block 610. The area covered by these four pixel blocks is 32×32, i.e., the size of four macroblocks. Typically, the pixel values in each pixel block differ in color, intensity, and the like. To illustrate this difference adjacent blocks are shown as black or white. As such, when this region coded, the non-aligned subblocks (e.g. blocks 604, 608, and 610) produce AC components in the DCT coefficients of this macroblock. The block 606, which is larger than a macroblock, only contains a DC component as a DCT coefficient.

Although various embodiments which incorporate the teachings of the present invention have been shown and described in detail herein, those skilled in the art can readily devise many other varied embodiments that still incorporate these teachings.

What is claimed is:

1. A method of forming a test bitstream for evaluating a video decoder, comprising the steps of:

forming a first anchor image having a first set of motion vectors representing motion of an object;

forming a second anchor image having a second set of motion vectors representing motion of said object, where said second set of motion vectors having characteristics that are different from said first set of motion vectors and where a combination of said first and second anchor images substantially produces an image containing said object;

providing a bi-directional predicted image containing said object; and coding, using a predictive image coder, the first anchor image, the second anchor image, and the bi-directional predicted image to produce said test bitstream.

2. The method of claim 1 wherein said object is a uniformly gray region.

3. The method of claim 2 wherein said uniformly gray region has a size that is N times a block size used in the block-based coder, where N is an integer having a value greater than or equal than 1.

4. The method of claim 1 wherein said object is an image region partitioned into unequal sized sub-blocks of pixels.

5. The method of claim 1 wherein said first and second anchor images are P-frames of a Moving Pictures Expert Group (MPEG) standard group of pictures.

6. The method of claim 1 wherein said bi-directional predicted image is a B-frame of a Moving Pictures Expert Group (MPEG) standard group of pictures.

7. The method of claim 1 further comprising the step of generating a title image for the test bitstream containing a font having smooth curves whereby the title image requires substantially few bits to code.

8. The method of claim 1 further comprising the step of generating a terminating page having a blocked font where the blocks are aligned with the pixel blocks encoded in the coder.

9. The method of claim 1 wherein the first and second set of motion vectors are contained within bounds of the first and second anchor frames.

10. The method of claim 1 further comprising the steps of providing a plurality of bi-directional predicted images containing said object and coding said plurality of bi-directional predicted images.

11. The method of claim 1 further comprising a title image for indicating the type of decoder test being conducted that is encoded as a portion of said test bitstream for evaluating said video decoder, the title image stored in a computer-readable storage medium as said portion of said test bitstream comprising a font having smooth curves whereby the title image requires substantially few bits to code.

12. The method of claim 1 further comprising a terminating image for indicating the end of a decoder test, where said terminating page is coded as a portion of a test bitstream for evaluating a video decoder, the terminating page stored in a computer-readable storage medium as said portion of said test bitstream comprising a blocked font where the blocks are aligned with the pixel blocks encoded in a coder that produces the test bitstream.

13. A bitstream stored in a computer-readable storage medium and recalled from said storage medium for evaluating a video decoder comprising:

a coded first anchor image having a first set of motion vectors representing motion of an object;

a coded second anchor image having a second set of motion vectors representing motion of said object, where said second set of motion vectors having characteristics that are different from said first set of motion vectors and where a combination of said first and second anchor images substantially produces an image containing said object; and a coded bi-directional predicted image containing said object.

14. The bitstream of claim 13 wherein said object is a uniformly gray region.

15. The bitstream of claim 14 wherein said uniformly gray region has a size that is N times a block size used in a block-based coder that codes the images, where N is an integer having a value greater than or equal to 1.

16. The bitstream of claim 13 wherein said object is an image region partitioned into unequal sized sub-blocks of pixels.

17. The bitstream of claim 13 wherein said coded first anchor image is a P-frame of a Moving Pictures Expert Group (MPEG) standard group of pictures.

18. The bitstream of claim 13 wherein said coded bi-directional predicted image is a B-frame of a Moving Pictures Expert Group (MPEG) standard group of pictures.

19. The bitstream of claim 13 further comprising a coded title image containing a font having smooth curves whereby the title image requires substantially few bits to code.

20. The bitstream of claim 13 further comprising a terminating page having a blocked font where the blocks are aligned with the pixel blocks encoded in a coder.

21. The bitstream of claim 13 wherein the first and second set of motion vectors are contained within bounds of the first and second anchor frames.

22. The bitstream of claim 13 further comprising a plurality of coded bi-directional predicted images contain, said object.

23. A method of evaluating a video decoder comprising the steps of:

coupling a test bitstream to said video decoder, where said test bitstream contains: a coded first anchor image having a first set of motion vectors representing motion of an object; a coded second anchor image having a second set of motion vectors representing motion of said object, where said first set of motion vectors having characteristics that are different from said first set of motion vectors and where a combination of said first and second anchor images substantially produces an image containing said object; and a coded bi-directional predicted image containing said object; decoding said test bitstream using said video decoder; and observing a decoded image produced by said video decoder in response to decoding said test bitstream, where said decoded image is distorted if said video decoder did not correctly decode said bi-directional predicted image contained in said test bitstream.

* * * * *